Oct. 10, 1972  W. BUSCH ET AL  3,697,303

PROCESS FOR COATING THE SURFACE OF A MATERIAL

Filed Sept. 29, 1969  2 Sheets-Sheet 1

NEGATIVE CHARGING OF A 50μ THICK
POLYESTER FILM BY MEANS OF A DIRECT-
CURRENT CORONA. (d = LENGTH OF THE
CHARGED AREA OF THE FILM)
 a) CORONA VOLTAGE OF ABOUT 11 kV
 b) CORONA VOLTAGE OF ABOUT 9 kV

FIG. 1

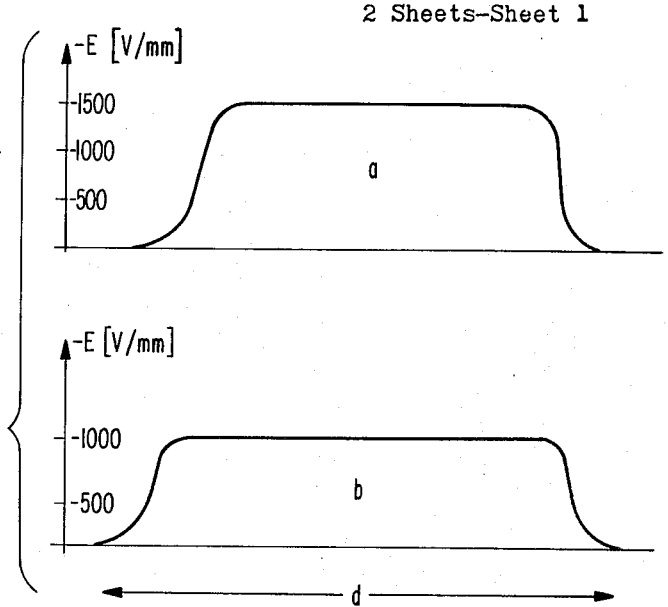

FIG. 2

BAND-LIKE NEGATIVE CHARGING OF A
PLASTIC FILM.
 a = WIDTH OF THE BAND
 b = DISTANCE BETWEEN CHARGED BANDS
   (SCHEMATICALLY)

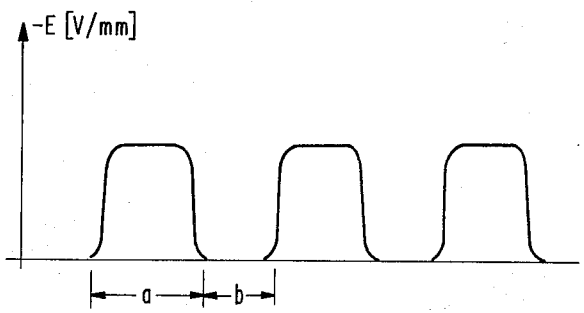

FIG. 3

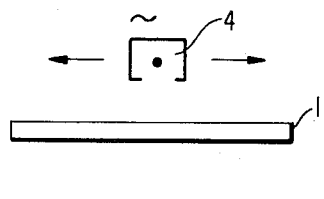

FIG. 4a

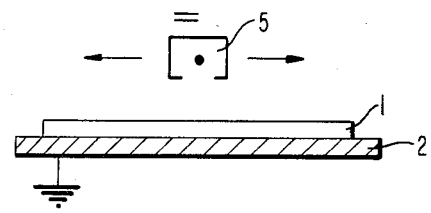

FIG. 4b

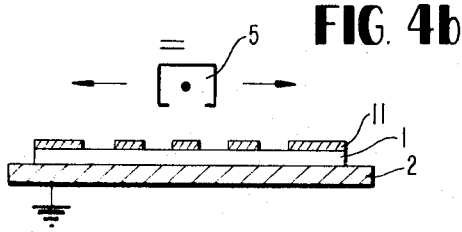

INVENTORS
WALTER BUSCH
HEINZ KRÄMER
ERWIN LIND
DEITER MESSNER

BY *Bryan and Butrum*

ATTORNEYS

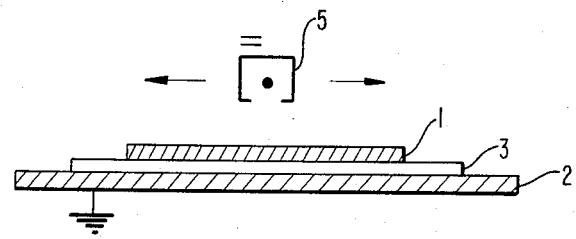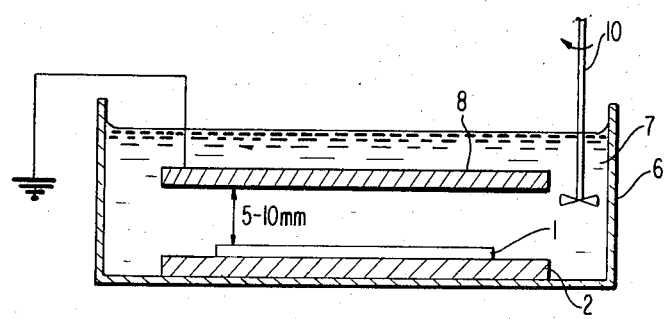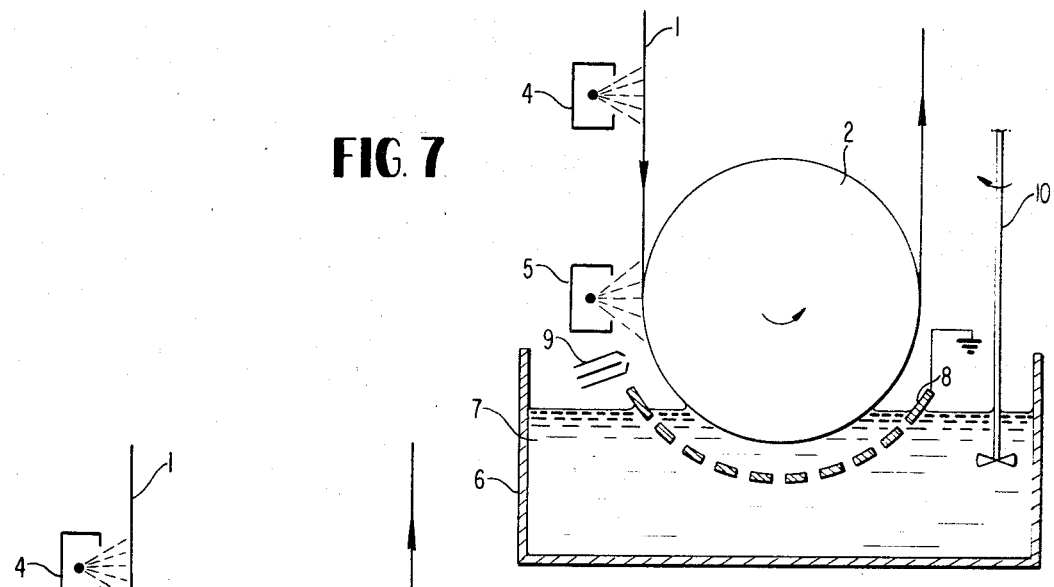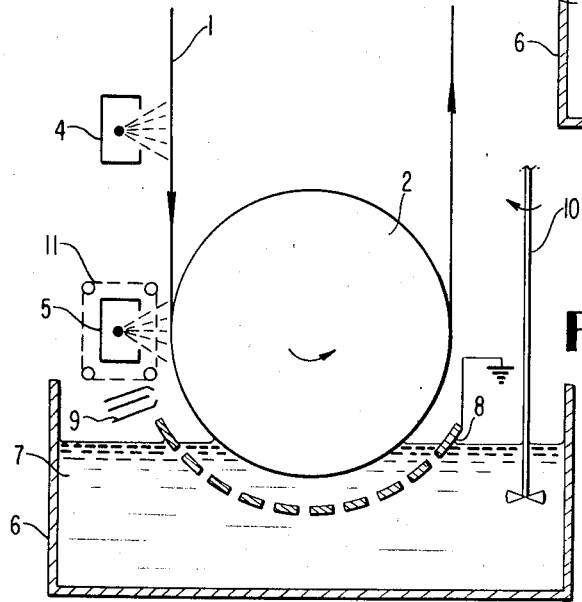

3,697,303
PROCESS FOR COATING THE SURFACE OF A MATERIAL
Walter Busch, Wiesbaden-Biebrich, Heinz Kramer, Wiesbaden-Bierstadt, Erwin Lind, Auringen uber Wiesbaden, and Dieter Messner, Wiesbaden-Biebrich, Germany, assignors to Kalle Aktiengesellschaft, Wiesbaden-Biebrich, Germany
Filed Sept. 29, 1969, Ser. No. 861,794
Claims priority, application Germany, July 31, 1969, P 17 90 220.4
Int. Cl. B44d 1/06
U.S. Cl. 117—37 LE      13 Claims

ABSTRACT OF THE DISCLOSURE

This invention relates to a process for coating the surface of a material with an electrically conductive, semi-conductive, or non-conductive substance, in which process either a highly insulating base material or base material with a highly insulating backing is completely discharged, the surface of the material is then electrically charged by means of a direct-current corona discharge, and coated within a field of uniform field strength distribution with the substance dispersed in a dielectric liquid, while the material is in close contact with an electrically conductive support.

---

The present invention relates to a process for coating the surface of a material with an electrically conductive, semi-conductive or non-conductive substance. Further, it relates to an apparatus for performing the coating process.

In the known coating processes, the substance to be coated on the surface of the material is applied by immersion of the material in a dispersion or a coating solution. Various methods are used for smoothing the coating and adjusting the desired layer thickness. Coating processes in which smoothing of the coating is achieved by brushes, distributing rollers, doctor blades or air brushes are exemplary. Further, coating processes are known in which smoothing of the layer is achieved by contact with highly polished counter-surfaces.

The system of application also may be modified in such a manner that it is not the web of material which is immersed in the coating dispersion, but the dispersion is applied to the material or the web by means of one or more applicator rolls.

Due to the doctoring methods used, the layers thus produced on the surface are of a relatively uneven, frequently streaky, structure.

In addition to these purely mechanical coating methods, electrostatic or electrophoretic coating and lacquering processes have been increasingly used recently. In the case of the electrostatic lacquer spraying process, the material to be applied is sprayed, e.g. from the slot of a hollow body, in an extremely fine distribution under the influence of a high tension direct current and deposited on the base material in the form of a uniform layer.

This method is restricted to base materials of electro-conductive or electrostatically conductive materials. Further, it has the disadvantage that relatively high working voltages, of about 100 to 150 kv., must be employed.

The known electrophoretic lacquering process is based on the migration of electrically charged lacquer or pigment particles in a liquid under the influence of an electric field. Only those materials can be electrophoretically coated which have a surface of uniform electroconductivity. This means that the process is restricted to metallic materials when a low tension direct-current, i.e. between 50 and 150 volts, is employed. Non-conductive or semi-conductive materials can be coated by this method only when much higher voltages, about 100 kv., are applied.

Only aqueous-dispersed emulsion systems or solutions are suitable for the electrophoretic coating method. The electrophoretic bath must have a specific resistance of a relatively low value, i.e. about $10^2$ to $10^3$ ohm. cm. The high current densities required, of about 20 to 40 amp/m.$^2$, which necessitate special electrode constructions and cooling systems for the rectifier, are the main disadvantages of this method.

The present invention provides a process for coating the surface of a material, which eliminates the drawbacks described and has a wide range of application, viz. to electrically conductive, semiconductive, and non-conductive substances as coating materials and to highly insulating as well as non-insulating base materials, with simplified process conditions.

In the present process, a highly insulating base material, or a base material with a highly insulating backing, is completely discharged, the surface of the material is then electrically charged by means of a direct-current corona discharge, and coated within a field of uniform field strength distribution with the coating substance dispersed in an insulating liquid, while the material is in close contact with an electrically conductive support. The highly insulating base material or the insulating backing has a surface resistance of at least $10^{12}$ ohm, measured in accordance with DIN method No. 53482.

The process may be performed either discontinuously, using e.g., a base material in the form of sheets, or rhythmically, or as a fully continuous process, using, e.g. film webs fed from take-off rolls. The rhythm of the machine or the feed speed of the films are dependent on the charging time required, on the charge intensity (charging time x strength of corona) which can be adjusted to the desired layer thickness, and also substantially on the concentration of the coating composition.

In the case of a highly insulating material, or of a material with a highly insulating backing, the charge also may be applied in such a manner that only selected areas of the surface of the base material are homogeneously charged. This may be achieved, e.g. by placing a mask containing openings, which may be in the form of figures, characters or the like, on the material before it is charged. In this manner, charged bands and, consequently, band-like coatings are produced by using a mask with band-like openings. This is schematically indicated in FIG. 2. In the case of a rhythmic or fully continuous performance of the process, there are several alternatives for using a mask. Thus, the base material may be conducted past a stationary mask provided with openings in the form of holes, when a band-like charge is desired, for example. In some cases, it has proved to be of advantage to move the masks in synchronism with the web fed from the roll. With synchronized speeds, the most varied types of patterns may be reproduced very sharply on the base material.

Substances which are dispersible in insulating liquids and may consist of electrically conductive pigments, such as carbon black, graphite or metal pigments, as also of semi-conductive or non-conductive substances, such as metal oxides, dyestuff pigments and the like, may be used as coating materials.

Highly insulating base materials which may be coated are all sheet-like materials, such as films, plates or the like of the most varied kinds. Films of plastic materials, e.g. of polyesters, polyolefins, polyvinyl chloride, polystyrene, polyamide, polycarbonate, and the copolymers and polymer mixtures thereof, and films of cellulose derivatives, or compound films and lacquered films of these materials are preferred. Sheet-like materials with a surface resistance of less than $10^{12}$ ohm also may be coated by the process according to the invention, provided care is taken that they are supported by a highly insulating backing. Such materials are, e.g., regeneration cellulose film, paper, glass or metals.

Liquids having a specific resistance of at least $10^{10}$ ohm x cm. may be used as insulating liquids. Low viscosity mineral oils, halogenated hydrocarbons, cyclic aliphatic or aromatic hydrocarbons, or mixtures thereof with each other, may be used for example. High boiling point, liquid aliphatic hydrocarbons are preferred.

The discharge of the base material is effected by means of substances which ionize the air, such as radioactive isotopes, for example polonium 210. An alternating-current corona discharge is preferred for this purpose, however.

The invention is based upon the peculiarity of highly insulating sheet-like materials or materials, supported on a highly insulating backing, to maintain electric charges applied to their surfaces over a relatively long period of time. When the electrically charged base material is immersed in a coating bath of high electrical resistance, the dispersed particles carrying a charge of opposite polarity contained therein are attracted by the material to be coated and are deposited on its surface. In this manner, a layer is formed on the base material whose thickness depends primarily on the magnitude of the charge on the base material. The original distribution of the charge on the base material is reflected by a corresponding distribution of the thickness of the layer deposited.

By the process of the present invention, a uniform layer of highly constant thickness may be produced by applying a homogeneous surface charge to the material to be coated.

The invention will be further illustrated by reference to the accompanying drawings in which FIG. 1 shows charge profiles produced on a polyester film of 50$\mu$ thickness with a direct-current corona discharge at varying operating voltages. The homogeneous charge distribution appears as a constant plateau.

FIG. 2 shows charge profiles produced in the band-like negative charging of a plastic film, FIGS. 3 to 6 schematically illustrate the various process steps of the coating process of the invention, and FIGS. 7 and 8 illustrate two different embodiments of continuous coating processes.

Normally, highly insulating materials, e.g. plastic films, always carry static charges, which are caused by the numerous contacts and separations during production, processing and handling of the material in question. These non-homogeneous and unintentional charges, which, as regards magnitude and polarity of charge, may vary greatly from spot to spot, are first removed by means of known discharging methods. Preferably, high voltage ionizers operating with alternating current are used for this purpose. The sheet-like base materials to be discharged are conducted at a distance of 1 to 2 cm. past the required number of ionizers, thus causing a complete discharge of the material. The state of electrical discharge obtained in this manner may be checked by means of a highly resolving measuring probe disclosed in U.S. Pat. No. 3,443,224. After the material to be coated has been discharged, it is charged again by means of a direct-current corona discharge. The magnitude of the charge depends primarily on the following parameters; operating voltage of the corona discharge, which is normally in the range of 5 to 15 kv.; distance of the corona from the material to be charged, which ranges from a few millimeters to about 1 cm.; thickness of the material to be charged; and, in the case of a rhythmic or continuous performance of the process, the speed with which the supported material is conducted through the charging zone. Ultimately, the magnitude of the charge corresponds to the limiting charge determined by the dielectric strength of the air. This is about $2.7 \cdot 10^{-5}$ coulomb/m.$^2$. Below this value, the magnitude of the charge may be adjusted as desired, by varying the above parameters. The homogeneity of distribution of the charge applied is again checked by means of a finely resolving measuring probe.

The surface of the base material may be positively or negatively charged. According to the invention, negative charging of the surface is preferred.

At a surface resistance of the base material of $10^{12}$ ohm or more, the natural fading of the charge is already so slow that no noticeable discharge takes place between the rapidly following process steps of charging and coating in the coating bath. Consequently, it is not necessary to perform the coating step immediately after the charging operation, but coating may be deferred to a later time, in accordance with the rate of fading of the charge.

After coating, the base material is removed from the bath and dried. A satisfactory adhesion of the electrostatically applied layer on the base material may be achieved by a preliminary drying with air, action of liquid or gaseous solvents, and after-drying at an elevated temperature, the drying and fixing conditions in each case being dependent upon the coating material and the base material used.

The process of the invention is superior in essential points to processes already known. Whereas an electrophoretic coating process can be performed only with difficulty, or fails completely, with base materials of high electrical resistance values, such high resistance values of the base are required for the process of the present invention. Accordingly, in the case of materials having surface resistances of less than $10^{12}$ ohm, these materials must be supported on a highly insulating backing. A further advantage over the electrophoretic coating process is a considerably simple installation. This applies also to electrostatic lacquering processes which, moreover, are also restricted to conductive materials. As compared with purely mechanical coating processes, the process of the invention has the advantage that it involves no doctoring off of excess coating dispersion, so that formation of the above-mentioned undefined and uneven, streaky structure of the layer is avoided.

The process according to the invention renders it possible to produce surface coatings of different physical properties on various kinds of base materials. The production of electroconductive layers, of photosemiconductor layers, of recording tape layers, and of dyestuff layers on highly insulating base materials are exemplary.

The present invention also includes an apparatus for performing the process of the invention. The apparatus comprises a discharging station 4 and a grounded electroconductive support 2 for the base material 1, a direct-current corona 5, a container 6 holding the dispersion 7, and a grounded sheet-like metal electrode 8, which is positioned within the dispersion at an adjustable distance from the base material.

The coating process begins with the discharging of the highly insulating base material or the material with a highly insulating backing, by means of the discharging station 4 (see FIG. 3). The base material 1 is then placed in close contact with the grounded conductive support 2 and fed to the charging station 5 whose distance is adjustable (see FIG. 4a). If desired, the surface of the base material may be partly covered by masks 11 (see FIG. 4b). When a non-insulating base material 1 is coated, an appropriate insulation 3, e.g. by a plastic film, must be provided (FIG. 5). During charging, a constant distance is maintained, so that the, preferably negative, charge applied to the surface of the highly insulating base material or material with the highly insulating backing is locally constant. The charged base material 1 and the suport 2 are then immersed in the coating bath 7 (FIG. 6). In the case of non-insulating base material, this is immersed in the coating bath 7 together with the insulation 3. In the case of insulating base material, the support 2 prevents the homogeneous charge profile, shown in FIGS. 1 and 2, from changing in an undefined manner. The actual coating process is illustrated by FIG. 6. It takes place, for example, in a trough or container 6 filled with the coating dispersion 7, which is circulated by pumping or by an agitator 10. A sheet-like grounded metal electrode 8 is mounted opposite the base material 1 in the bath at a distance therefrom which is adjustable from 5 to 10 mm. and preferably is 6 mm. In order to cause an even concentration of the coating dispersion, the surface of the metal electrode 8 is preferably perforated or consists of a fine-meshed wire net. The plate condenser-like arrangement creates a homogeneous field distribution between the charged base material 1 and the metal electrode 8. In this manner, the deposition of an even layer of constant thickness is guaranteed.

The thickness of the layer produced is substantially determined by the following parameters: magnitude of the charge on the base material, immersion time of the base material in the coating bath, and concentration of the coating bath.

The coating operation shown in FIG. 6 may be varied as desired. Thus, the metal electrode 8 and the base material 1 with the support 2 may be exchanged in such a manner that the base material and the support are positioned above the metal electrode 8. Alternatively, elements 1–2 and 8 may be vertically mounted in the coating bath. When the container 6 is of metal and is grounded, the bottom of the container itself may have the function of the element 8.

Particularly in the case of highly insulating base materials, the coating process also can be performed continuously, as is shown in FIG. 7. In this case, the roller 2 has the function of a metal support and the perforated electrode 8 that of the metal electrode. The homogeneity of the charge applied is checked with the aid of the finely resolving measuring probe 9.

In the case of a rhythmic or fully continuous process in which masks are used, these may be conveyed synchronously with the rhythm of the machine or the feed of the web, as already described. Known devices, such as rollers, synchronous motors, connecting rods and the like may be used for this purpose. FIG. 8 shows a diagrammatic representation of a mask 11 within a fully continuous apparatus, which follows the movement of the web over four rollers, the openings in the mask being indicated by the dashed lines. Other constructions also are possible, however, so that the invention is not limited to the embodiment shown.

After the end of the coating operation, the coated base material 1 leaves the bath, passes through a drying system, and is then subjected to the above described adhesion-improving treatment, if necessary.

The invention will be illustrated by the following examples:

EXAMPLE 1

A 50μ thick polyester film of Hostaphan® (a product of Farbwerke Hoechst A.G., Germany) was first completely freed from electrostatic charges of both polarities by means of a 50 Hz. alternating-current corona discharge. The film was then placed on a metal support and homogeneously charged by means of a direct-current corona discharge. The film was then placed on a metal support and homogeneously charged by means of a direct-current corona discharge operating at 10 kv. The charge on the film corresponded to a field strength of —3.5 kv./cm., measured with a commercial field strength measuring instrument. The homogeneity of distribution of the charge was checked by means of a finely resolving measuring probe. The charged film was then immersed in a bath which had been prepared as follows:

20 g. of carbon black, e.g. Printex® (a product of Degussa A.G., Germany) were finely dispersed in 200 g. of linseed stand oil. The dispersion was then diluted with 10 l. of a high boiling point aliphatic hydrocarbon, such as Shellsol® (a product of Shell A.G.). Finally, 100 mg. of cobalteous naphthenate were added. While the charged film was immersed (20 seconds), care was taken that the film remained in contact with the metal support and that the charged surface of the film was in the neighborhood of a metal surface acting as counter-electrode. When the film was removed from the bath, it was covered with a homogeneous layer of carbon black. Excess bath was removed by evaporation with the aid of warm air. For better adhesion of the carbon black layer, the film was briefly heated to 200° C.

EXAMPLE 2

The procedure employed in Example 1 was repeated, except that an aluminum dispersion served as the bath, which was prepared as follows: 10 g. of aluminum bronze were finely dispersed in a solution of 20 g. of linseed stand oil and 20 g. of a rosin ester, e.g. Pentalyn® (a product of Hercules, Inc., U.S.A.) in 100 ml. of a high boiling point aliphatic hydrocarbon, e.g. Isopar® (a product of Esso A.G.). The dispersion was then diluted with 1 l. of the same hydrocarbon. After removal from the bath, the film was freed from excess bath liquid. In order to improve the adhesion of the aluminum layer, the film was then conducted through a second bath containing a 10 percent by weight solution of trichloroacetic acid in a high boiling point aliphatic hydrocarbon. Finally, the aluminum-coated film was dried at 170° C.

EXAMPLE 3

An 80μ thick film of plasticized polyvinyl chloride was first freed from electrostatic charges by means of an alternating-current corona discharge and then homogeneously charged with a direct-current corona discharge. The applied charge corresponded to a field strength of —2.6 kv./cm. Analogously to Example 1, the charged film was then conducted for 30 seconds through a coating bath prepared as follows: 20 g. of iron-III-oxide were finely dispersed in a solution of 40 g. of linseed stand oil and 40 g. of a rosin ester, e.g. Pentalyn®, in 200 ml. of a high boiling point aliphatic hydrocarbon, e.g. Shellsol®. The resulting dispersion was then diluted with the same hydrocarbon to a volume of 10 l. The charged polyvinyl chloride film was conducted at a distance of 6 mm. past a counter-electrode, while being in close contact with a metal support. In order to prevent a settling of the iron-III-oxide dispersion, the bath was constantly circulated by pumping. When removed from the bath, the film was uniformly covered with $Fe_2O_3$. After complete removal of the bath liquid, the film was passed briefly through an atmosphere enriched with butanone vapors in order to improve the adhesion of the iron oxide layer.

EXAMPLE 4

A 40μ thick film of rigid polyvinyl chloride was pretreated as described above and then uniformly charged electrostatically to a potential of —3 kv./cm. The charged film was then conducted for about 15 seconds through a coating bath filled with a copper dispersion prepared as follows: 10 g. of copper bronze were finely dispersed in a solution of 20 g. of linseed stand oil and 20 g. of a rosin ester, e.g. Pentalyn®, in 100 ml. of a high boiling point aliphatic hydrocarbon, e.g. Shellsol®. The dispersion was diluted with 1 l. of the same hydrocarbon. Upon removal from the coating bath, the film was uniformly coated with copper. The adhesion of the copper layer to the rigid polyvinyl chloride film was good.

EXAMPLE 5

A 25μ thick polypropylene film was electrostatically charged, as described in Example 1, so that the charge corresponded to a field strength of —3.0 kv./cm. The charged film was then introduced into a coating bath obtained by finely dispersing 10 g. of a phthalocyanine blue dyestuff, e.g. Heliogenblau® (a product of BASF, Germany) in a solution of 50 g. of a rosin ester, e.g.

Pentalyn®, in 100 ml. of a high boiling point aliphatic hydrocarbon and diluting the resulting dispersion with 10 l. of the same hydrocarbon. Upon removal from the bath, the film carried a uniform blue coating.

EXAMPLE 6

Instead of the polyester film used in Example 1, a 60μ thick polystyrene film was charged in such a manner that its charge corresponded to a field strength of —3.9 kv./cm.; further procedure was as described in Example 1. A polystyrene film covered with a homogeneous layer of carbon black was thus obtained. In order to achieve a satisfactory adhesion of the carbon black layer, the film was conducted for a short time, at room temperature, through an atmosphere enriched with solvent vapors. Butanone or methylene chloride were particularly suitable solvents for this purpose.

EXAMPLE 7

A 50μ thick cellulose acetate film was first freed from any electrostatic charges thereon by means of an alternating-current corona discharge, and then homogeneously charged with a direct-current corona discharge, so that a field strength of —2.7 kv./cm. could be measured. The charged film was then conducted for 20 seconds, as already described, through a bath which had been prepared as follows: 50 g. of zinc oxide were finely dispersed in a solution of 100 g. of linseed stand oil and 100 g. of a rosin ester, e.g. Pentalyn®, in 500 ml. of a high boiling point hydrocarbon. The resulting dispersion was diluted with 15 l. of the same hydrocarbon. In order to prevent settling of the zinc oxide, the bath was constantly circulated by pumping. While the film was immersed in the bath, it was close contact with the metallic support on which it had been charged, and at a distance of 5 mm. from a counter-electrode. In this manner, a zinc oxide coated cellulose acetate film was produced.

EXAMPLE 8

A 40μ thick polycarbonate film, e.g. Makrofol® (a product of Farbenfabriken Bayer, Germany) carrying a charge which corresponded to a field strength of —3.2 kv./cm., was conducted through a bath filled with a carbon black dispersion, as described in Example 1. The bath composition was the same as in Example 1. A polycarbonate film with a homogeneous carbon black coating was thus obtained.

EXAMPLE 9

A 100μ thick aluminum foil was placed on a highly insulating plastic film, e.g. a 50μ thick film of Hostaphan®, discharged as already described, and then charged by means of a direct-current corona discharge operating at 10 kv. The charge produced on the aluminum foil corresponded to a field strength of —3.5 kv./cm. Together with the highly insulating support, which prevented a leakage of the charge, the aluminum foil was then immersed for 30 seconds in a bath prepared as follows: 20 g. of carbon black were finely dispersed in 200 g. of linseed stand oil and the resulting dispersion was diluted with 10 l. of a high boiling point aliphatic hydrocarbon, e.g. Shellsol®. While the charged aluminum foil was immersed in the bath, care was taken that it remained in contact with the plastic support and that the surface of the charged aluminum foil was in the negibhorhood of a metal surface acting as counter-electrode. Upon removal from the bath, the film was covered with a homogeneous layer of carbon black. Excess bath liquid was removed by evaporation with warm air. An improvement of the adhesion of the carbon black layer to the aluminum foil was achieved by a heat-treatment at 200° C.

EXAMPLE 10

A 50μ thick polyester film, e.g. a film of Hostaphan®, was discharged as described in Example 1 and then placed on a metal support. A mask consisting of a 100μ thick aluminum foil with openings therein was then placed on the free surface of the plastic film and in direct contact therewith. The combination consisting of mask, plastic film, and metal support was then fed to a direct-current corona discharge operating at 10 kv., where only the areas of the plastic film left free by the openings in the mask were charged. The mask was then removed and the plastic film with the metal support was immersed for 20 seconds in a coating bath the composition of which corresponded to that of Example 9. During immersion, only those areas of the film were coated which had been underneath the mask openings and thus had been charged. After drying the film in an oven, the adhesion of the layer was improved by an after-treatment with a 10 percent by weight trichloroacetic acid solution (see Example 2).

EXAMPLE 11

A 50μ thick polyester film, e.g. a Hostaphan® film, was continuously drawn off a take-off roll by means of a pair of draw-off rolls, then conducted past discharging and charging zones (as described in Example 1), deflected by a roller mounted in a coating bath having the composition stated in Example 1 (FIG. 7), and finally dried with warm air and wound up.

EXAMPLE 12

A method described in Example 11 was repeated, except that, in the charging zone, an endless mask guided around 4 rollers followed the movement of the film web synchronously with the speed of the web. In this manner, the areas of the film covered by the mask were not charged and thus remained uncoated during the subsequent coating process.

It will be obvious to those skilled in the art that many modifications may be made within the scope of the present invention without departing from the spirt thereof, and the invention includes all such modifications.

What is claimed is:

1. A process for coating the surface of a material with an electrically conductive, semi-conductive, or non-conductive substance, which comprises completely discharging a highly insulating base material, electrically charging the surface of the material by means of a direct-current corona discharge, and coating the material within a field of uniform field strength distribution without additional source of potential with the substance dispersed in a dielectric liquid, while the material is in close contact with an electrically conductive support.

2. A process according to claim 1 in which the base material is continuously passed through the discharging, charging, and coating steps at a specific speed.

3. A process according to claim 1 in which the material is covered with masks and only partial areas thereof are homogeneously charged and coated.

4. A process according to claim 3 in which the masks are continuously passed at least through the charging step at a speed corresponding to that of the base material.

5. A process according to claim 1 in which the base material has a surface resistance of at least $10^{12}$ ohm.

6. A process according to claim 1 in which the base material comprises a portion having a surface resistance less than $10^{12}$ ohm on a highly insulating backing.

7. A process according to claim 1 in which the base material is provided with a homogenous surface charge.

8. A process according to claim 1 in whch the surface of the base material is negatively charged.

9. A process according to claim 1 in which the base material is a synthetic plastic film.

10. A process according to claim 1 in which the base material is a cellulose derivative on a highly insulating backing.

11. A process according to claim 1 in which discharging is effected by means of an alternating-current corona discharge.

12. A process according to claim 1 in which the magnitude of the charge on the material is adjusted so that a layer of predetermined thickness is produced.

13. A process according to claim 1 in which the dielectric liquid has a specific resistance of at least $10^{10}$ ohm cm.

References Cited

UNITED STATES PATENTS

| | | | |
|---|---|---|---|
| 2,952,559 | 9/1960 | Nadeau | 117—93.4 X |
| 2,898,279 | 8/1959 | Metcalfe et al. | 117—93.4 UX |
| 3,321,768 | 5/1967 | Byrd | 346—74 |
| 3,311,490 | 3/1967 | Fauser et al. | 117—37 LE |
| 3,335,026 | 8/1967 | De Geest et al. | 117—93.4 |
| 3,462,286 | 8/1969 | De Geest et al | 117—93.4 |

FOREIGN PATENTS

| | | | |
|---|---|---|---|
| 1,153,098 | 5/1969 | Great Britain | 117—37 LE |

ALFRED L. LEAVITT, Primary Examiner

J. H. NEWSOME, Assistant Examiner

U.S. Cl. X.R.

117—93, 93.1 CD, 93.4 A, 38